Figure 1:
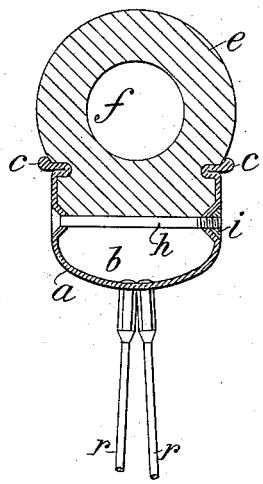

No. 612,583. Patented Oct. 18, 1898.
S. C. DAVIDSON.
RIM AND TIRE FOR WHEELS.
(Application filed July 27, 1897.)
(No Model.)

WITNESSES:
Fred White
René Pruine

INVENTOR:
Samuel Cleland Davidson,
By his Attorneys,

UNITED STATES PATENT OFFICE.

SAMUEL CLELAND DAVIDSON, OF BELFAST, IRELAND.

RIM AND TIRE FOR WHEELS.

SPECIFICATION forming part of Letters Patent No. 612,583, dated October 18, 1898.

Application filed July 27, 1897. Serial No. 646,119. (No model.)

*To all whom it may concern:*

Be it known that I, SAMUEL CLELAND DAVIDSON, merchant, of the Sirocco Engineering Works, Belfast, Ireland, have invented certain new and useful Improvements in Rims and Tires for Wheels, of which the following is a specification.

My invention has reference to rims and tires for wheels, and particularly to wheels of carriages, bicycles, and other road-vehicles; and its chief objects are to construct a light rim of great strength and so that it will securely hold and support an india-rubber, leather, or other more or less elastic tire, and to construct tires specially adapted to fit within and be supported by the improved rims.

The improved rims are of the type which have a continuous hollow or channel around the outer face, and a characteristic feature of the improved rim is that the edges or outer part of the sides of same are tightened up or pinched in against the tire and held firmly in this position by means of bolts or screws at, say, an inch apart, more or less, or other equivalent device passed transversely through the two sides of the rim at a suitable distance from the bottom of the hollow or channel, the result obtained from so drawing the edges of the rim toward one another and securing them in this position being a rim of great strength, and also that the tire is firmly and securely held upon the rim, while at the same time the tire is supported upon the bolts. The tires employed therewith are preferably of the type which may be termed "non-pneumatic," inasmuch as their resilience is not dependent on the employment of tubes inflated with air under pressure, such as in the tires usually known as "pneumatic;" but pneumatic tires, if suitably shaped, can also be used with my improved rims.

According to my invention in one modification of same I construct my improved wheel-rims of preferably sheet metal curved outward, so as to form a continuous hollow or channel around the outer face of the wheel-rim, and preferably with the outer edges of same turned inward (and then preferably outward again) as flanges or collars (hereinafter referred to as the "rim-collars") projecting into said hollow or channel, the inner edges of which are just sufficiently wide apart to allow the inner face of the tire employed therewith to pass between them. At a suitable distance within the circumference of the rim-collars I have a series of holes around both sides of the rim at usually about an inch apart, and these holes are preferably so indented inward as to form countersunk cavities to fit the heads and nuts of the bolts which I pass through same from one side of the rim to the other, so that when said nuts are tightened up thereon the outer edges of the rim and the turned-in rim-collars may be gradually drawn in toward one another. I construct the india-rubber, leather, or other more or less elastic tires to be mounted upon the above-described rims either as solid tires or with one or more tubular air-spaces therein of any suitable size or shape relative to that of the exterior surface of the tire, according to the extent of resilience desired and to the amount of weight that it is required to carry, and I form the inner face of the tire as an approximately flat surface of usually about or a little less than the full width of the tire itself at its widest place before it is secured in position on the wheel-rim, and with a continuous groove around each of its outer sides at a short distance outward from each edge of said flat inner face. Before tightening up the bolts the tire is mounted upon the rim, its inner face dropping or passing freely—that is to say, without requiring compression or forcing—in between the inner edges of the rim-collars and resting upon the bolts, in which position the groove around each side of the tire should be fairly opposite the inner edge of each of the rim-collars, so that when the nuts on the bolts through the rim are tightened up the outer edges of the rim are forced inward and the rim-collars are therefore gradually drawn in toward one another and become embedded in the grooves around the tire. When the bolts are sufficiently tightened up, the tire is held so firmly between the rim-collars that a perfectly secure attachment of it to the rim is insured. The support which the rim-bolts give to the inner face of the tire not only retains the tire conveniently in position while the rim-collars are being drawn into the side grooves of the tire by the tightening of the nuts on the bolts, but also prevents its being unduly forced into the bottom space in the rim-channel from the indentation of a pointed stone or other obstruction that the tire may encounter on a roadway, and at the same time the intermediate space between the bolts leaves so much of the inner face of the tire unsupported that its resistance against such indentation is consequently of an elastic or springy nature, which, as the inner face of the tire cannot be forced against the hard face of the rim, to a great extent prevents the stone cutting the india-rubber or causing jar or shock to the resilience of the tire.

According to another modification of my invention I employ a wheel-rim similar to that of the first hereinbefore-described modification with, in addition thereto, a rib or projection (hereinafter called the "rim" projection) around the central part of the hollow or channel in its outer face, which rim projection may be constructed of suitably-shaped sheet metal, brazed or otherwise secured to the wheel-rim, with or without holes in the outer face of same to give access to the spoke-heads, or it may be constructed of tough wood secured to the wheel-rim by screws through same from the inner side into the wood. Bolt-holes are formed in said rim projection, so that the bolts passing through the bolt-holes in the rim sides, as employed in the first hereinbefore-described modification, may also pass through the rim projection, whereby when the nuts on said bolts are tightened up the outer part of the rim sides and rim-collars are drawn in toward the rim projection. For this form of rim I construct the india-rubber, leather, or other more or less elastic tire with a hollow or channel around its inner face, so that a cross-section of the whole tire somewhat resembles a horseshoe in shape, or the hollow or channel may be constructed on the inner face of a tire formed with a tubular air-space in the body of same, or, if desired, the body of the tire may also be solid, so that two tire-flanges are thus formed thereon with the hollow or channel between same. I then spring said tire into position on the rim, so that the ends of the tire, when of horseshoe form, or the tire-flanges, when of tubular or solid construction, drop in freely between the rim sides and the rim projection. The nuts on the ends of the bolts on being then tightened up draw the rim sides and rim-collars in upon the tire ends or tire-flanges and press same against the rim projection, the inner edges of the rim-collars being thus embedded into the sides of the tire ends or tire-flanges, which are preferably made with a slight groove around their outer sides to insure the rim-collars clasping and holding the tire securely at the proper place.

To render any of the hereinbefore-described tires more efficiently suitable for variable weights or for heavy vehicles, such as carriages or motor-cars, I may construct them with an inward and somewhat V-shaped projection or rib in the tubular space or horseshoe cavity therein around the side opposite to and facing the wheel-rim, and so apply it thereon that in a cross-section of the projection or rib the apex of the V approximately faces the center of the wheel-rim, so that should the tire be subjected to unduly heavy weight or concussion and be much compressed thereby this projection or rib will be forced against the opposite interior face of the tire or against the rim projection, as the case may be. The outer part of the tire and sides is thus prevented from being too much pressed down upon the rim-collars, which otherwise might cause jar or shock thereon; also, when the tire is subjected to strong side thrusts this projection or rib comes in contact with and bears interiorly against one side or other, as the case may be, of the tire itself and gives it greater resistance to such side thrusts.

The improved wheel-rims hereinbefore described can be employed in connection with other tires than those described, whether non-pneumatic or pneumatic. These rims when drawn or pinched in by bolts or screws, as described, possess very great strength. The improved rims, in fact, constitute a characteristic feature of the invention independently of the particular tire employed.

Figure 2:
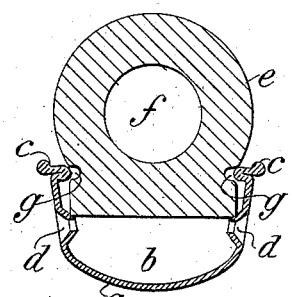
Figure 3:
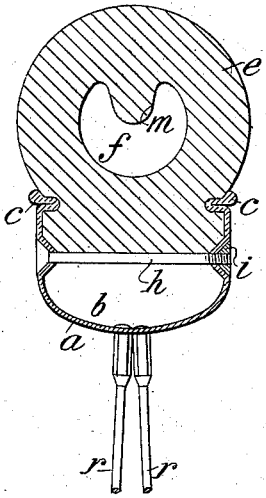
Figure 4:
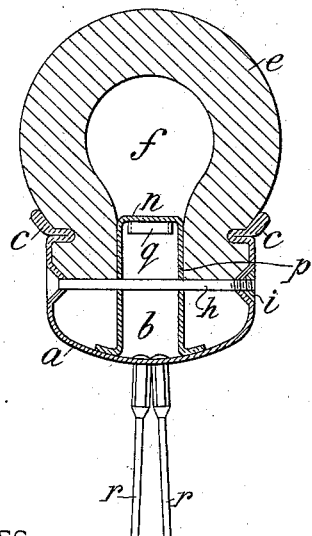
Figure 5:
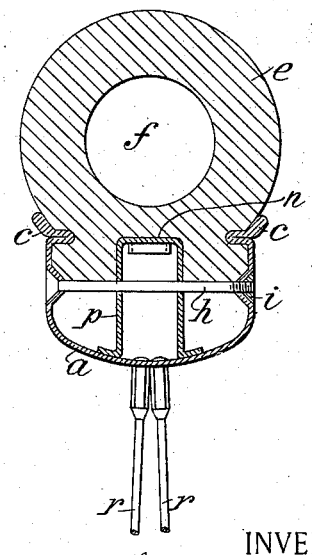

In the accompanying drawings, Figure 1 is a cross-section of a wheel-rim and a tire constructed in accordance with my invention with the tire mounted in position upon and firmly clasped and attached to the rim. Fig. 2 is a cross-section of the same rim and tire before the rim-bolts are tightened up to clasp the rim sides and collars upon and thereby secure the tire firmly to the rim. Figs. 3, 4, and 5 are cross-sections, respectively, illustrating modifications.

Referring first to Figs. 1 and 2, $a$ is the wheel-rim curved outward, so as to form a continuous hollow or channel $b$ around the outer face. $c\ c$ are rim-collars at the outer edges of the rim formed by flanging said edges inward and then again outward, (the return or outward flange being optional.) The inner edges of said collars $c\ c$ are just sufficiently wide apart to allow the inner face of the tire to pass between them. (See Fig. 2.) $d\ d$ are a series of holes around both sides of the rim at about an inch apart and preferably indented, so as to form countersunk cavities, as shown. $e$ is the india-rubber or other tire, which may be formed either with a tubular air-space $f$, as shown, or with more than one tubular air-space or solid. The inner face of the tire is flat in cross-section or approximately so. In each side of said tire is a continuous groove $g$ to receive the corresponding rim, collar, or flange $c$. $h$ is one of the tightening-up bolts. When the tire has been mounted on the rim, as shown in Fig. 2, the bolts $h$ are passed through the rim from side to side and tightened up by the nuts $i$. The outer edges of the rim are thereby forced inward, and the collars or flanges $c\ c$ are therefore gradually drawn in toward one another and become embedded in the grooves $g\ g$ of the tire. The tire is thus securely and firmly attached to the rim, and its inner face is supported by the bolts $h$.

The modification shown in Fig. 3 differs from that shown in Figs. 1 and 2 in having an approximately V-shaped projection or rib $m$ in the tubular air-space $f$ for the purpose hereinbefore described.

The modification shown in Fig. 4 differs from that shown in Figs. 1 and 2, firstly, in having a hollow or channel $n$ around the inner face of the tire extending into the tubular space $f$, so that a cross-section of the tire somewhat resembles a horseshoe in shape, and, secondly, in having a central rib or projection $p$ around the outer face of the rim-channel. $q$ represents one of a number of holes in the outer face of the rib $p$ to give access to the heads of the wheel-spokes $r$. In mounting the tire it is sprung into position on the rim so that the parts at the sides of the channel $n$ drop in between the sides of the rim and projection $p$. The bolts $h$ are then tightened up, so as to draw the rim sides and rim-collars $c\ c$ inward.

The modification shown in Fig. 5 differs from that shown in Fig. 4 merely in having the channel $n$ of insufficient depth to extend into the tubular air-space $f$.

It is obvious that in any of the modifications other suitable devices may be used in lieu of the bolts $h$ and nuts $i$. For example, wire can be used laced through the holes $d$ from side to side of the tire.

What I claim, and desire to secure by Letters Patent, is—

1. A wheel-rim having a continuous channel around its outer face, a projecting rib around the central part of said face, and bolts or other equivalent devices passed transversely through both sides of said rim and through said projecting rib and drawing or forcing the edges of said sides inward toward one another and securing them in this position, in combination with a tire fitting between the sides of said rim and having an approximately flat face bearing upon said bolts, and having also a recess in the inner face receiving said projecting rib, substantially as and for the purpose described.

2. In a wheel, a rim having a continuous channel around its outer face, a tire having an approximately flat inner face entering said rim but not extending to bottom of said channel, and bolts or other equivalent devices passed transversely through both sides of said rim at a distance from the bottom of said channel, whereby the edges of said sides are forced or drawn inward toward one another and against the sides of said tire, said bolts giving support to the inner face of said tire while allowing it to be forced between them in case of abnormal pressure, substantially as hereinbefore described.

3. In a wheel, a rim having a continuous channel around its outer face and an inturned flange at each of its outer edges, a tire entering said rim but not extending to bottom of said channel, said tire having an approximately flat inner face, and a continuous groove around each of its outer sides, and bolts or other equivalent device passed transversely through both sides of said rim at a distance from the bottom of said channel, whereby the edges of said sides are forced or drawn inward toward one another and against the sides of said tire and the inturned flanges into said grooves, said bolts giving support to the inner face of said tire while allowing it to be forced between them in case of abnormal pressure, substantially as hereinbefore described.

In witness whereof I have hereunto signed my name in the presence of two subscribing witnesses.

SAMUEL CLELAND DAVIDSON.

Witnesses:
THOMAS JAMES CARR,
ARCHIBALD H. R. CARR.